United States Patent
Wu

(10) Patent No.: US 6,173,042 B1
(45) Date of Patent: Jan. 9, 2001

(54) SYSTEM FOR ENABLING PERSONAL COMPUTER ACCESS TO AN INTERACTIVE VOICE RESPONSE SYSTEM

(75) Inventor: Charles C. Wu, Broomfield, CO (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/030,142

(22) Filed: Feb. 25, 1998

(51) Int. Cl.[7] ............ H04M 1/64; H04M 11/00
(52) U.S. Cl. ............ 379/88.04; 379/67.1; 379/88.18; 379/88.24; 379/93.24
(58) Field of Search ............ 379/67.1, 68, 74, 379/76, 81, 88.01, 88.04, 88.13, 88.17, 88.18, 92.01, 93.21, 93.25, 88.25, 900, 908; 704/220, 222, 233, 275; 455/417, 445, 461; 709/201, 202, 206, 219

(56) References Cited

U.S. PATENT DOCUMENTS

| | | | |
|---|---|---|---|
| 4,785,408 | * 11/1988 | Britton et al. | 704/220 |
| 4,935,954 | 6/1990 | Thompson et al. | 379/89 |
| 5,121,421 | 6/1992 | Alheim | 379/52 |
| 5,530,740 | * 6/1996 | Irribarren et al. | 379/88.17 |
| 5,568,540 | * 10/1996 | Greco et al. | 379/88.25 |
| 5,737,393 | * 4/1998 | Wolf | 379/67 |
| 5,742,905 | * 4/1998 | Pepe et al. | 455/461 |
| 5,822,405 | * 10/1998 | Astarabadi | 379/88.04 |
| 5,870,549 | * 2/1999 | Bobo, II | 709/206 |
| 5,937,041 | * 8/1999 | Cardillo, IV et al. | 379/93.25 |

* cited by examiner

Primary Examiner—Scott L. Weaver
Assistant Examiner—Allan Hoosain
(74) Attorney, Agent, or Firm—Duft, Graziano & Forest, P.C.

(57) ABSTRACT

A personal computer is typically equipped with a modem that enables the user to dial through the Public Telephone Switched Network (PTSN) to access an Interactive Voice Response system. Once connected to the Interactive Voice Response System, the present system for providing personal computer access to an interactive voice response system uses the touch-tone generation capability of the personal computer to implement a predefined script to navigate through the Interactive Voice Response System. The navigation path is defined by the selections provided by the Interactive Voice Response System to enable a user to reach a computer interaction site that represents one of the back-end selections served by the Interactive Voice Response System. Thus, once the Interactive Voice Response System is traversed, the user can interact with the computer to perform the desired tasks.

14 Claims, 2 Drawing Sheets

SYSTEM FOR ENABLING PERSONAL COMPUTER ACCESS TO AN INTERACTIVE VOICE RESPONSE SYSTEM

FIELD OF THE INVENTION

This invention relates to interactive voice response systems that enable a user, in response to prerecorded prompts, to navigate through a hierarchical menu of choices by means of the touch tone signals generated at the user's telephone to access a particular feature or service that is desired and, in particular, to a system that enables the user to automatically effect the same operation via a modem-equipped personal computer.

PROBLEM

It is a problem in the field of customer service systems to provide the customers with inexpensive yet efficient access to the desired services. In order to limit the expense involved in providing operators, many customer service systems include an Interactive Voice Response system (IVR) front end that serves to interface with the calling party to provide prompts to the calling party to enable the interactive voice response system to acquire sufficient customer information to direct the call in an appropriate and efficient manner. In particular, the interactive voice response system typically comprises a hierarchically ordered series of audio messages, each of which comprises a listing of the various choices available to the calling party at that particular juncture of the hierarchy. In response to presentation of these choices, the calling party typically elects to traverse another level of the hierarchy by selecting one of the options that were offered by the particular audio segment that was most recently presented to the calling party. The calling party presents their selection by operating a touch tone key on the telephone station set to thereby indicate the one of the plurality of choices that were offered. The interactive voice response system monitors the communication connection for the presence of touch tone signals that are indicative of a calling party selection of one of the menu options that is presently being offered. In response to receipt of a touch tone signal, the interactive voice response system traverses the hierarchy to the particular selection that was indicated by the presented touch tone signal. In this manner, the interactive voice response system enables the calling party to traverse a plurality of hierarchically organized choices to reach a particular service or feature that is of interest to the calling party.

By using the automated interactive voice response system, the customer service system avoids the need to provide human operators to perform the particular function that is provided by the interactive voice response system. This enables the provision of the features and services to be effected in an inexpensive and efficient manner. However, a limitation of such systems is that the calling party who is equipped with a personal computer cannot utilize the capability of the personal computer to proceed through the interactive voice response system to the desired feature or service, especially if the desired feature or service entails data interaction via the personal computer. It would be greatly advantageous to enable the interactive voice response system to interact with a personal computer to thereby enable the calling party at the personal computer to traverse the interactive voice response system to a particular destination wherein the calling party can use the personal computer to retrieve data from the customer service system and provide information such as customer order information to the customer service system.

A system for enabling a computer to interconnect with an interactive voice response system is disclosed in U.S. Pat. No. 4,935,954 and comprises apparatus that automatically polls a plurality of message service systems to obtain messages for a user. The apparatus is a computer that is attached to both the user's telephone station set and the communications switching system. The computer responds to control signals received from the communication switching system indicative of the arrival of a message that is stored on a message service system by periodically polling a number of message service systems to automatically retrieve messages for the user. The computer automatically performs the logon and message access procedures with the various message service systems. If the message service system is a voice messaging system, the computer generates audio tones and interprets the voice prompts presented by the voice messaging system to implement the above noted logon and message access procedures.

U.S. Pat. No. 5,121,421 discloses an interactive telephone communication system that enables a hearing impaired person, using a TDD, to send and receive information over a conventional telephone communication network without communicating directly with another person. The apparatus receives control signals from the hearing impaired user that are used to address a control matrix to locate a prestored text response. This response is then transmitted to the hearing impaired caller for display in text form on the TDD.

The above-noted automated systems therefore either elicit prestored text message responses from a memory to present to a user or automatically access a plurality of message storage systems seriatim to retrieve stored messages. The automated message retrieval system presents an immutable sequence of operations, in that the user is not involved in the operation of this system. In contrast, the message response system simply outputs a prestored text message in response to a user provided input control signal via a special terminal and does not enable users who are not equipped with such a terminal to communicate with such a system. Therefore, there is no known system that would enable a user equipped with a personal computer to navigate through an interactive voice response system using a personal computer to access a data server that provides a set of services whereby the user can input data to the server via the personal computer.

SOLUTION

The above described problem are solved and a technical advance achieved by the present system for providing personal computer access to an interactive voice response system that enables a personal computer to traverse the selections of an Interactive Voice Response system to access the back-end computer accessible service providing apparatus of the accessed site.

In particular, the personal computer is typically equipped with a modem that enables the user to dial through the Public Telephone Switched Network (PTSN) to access the Interactive Voice Response system. Once connected to the Interactive Voice Response System, the present system for providing personal computer access to an interactive voice response system (termed the "IVR access system" herein) uses the touch-tone generation capability of the personal computer to implement a predefined script to navigate through the Interactive Voice Response System. The navigation path is defined by the selections provided by the Interactive Voice Response System to enable a user to reach a computer interaction site that represents one of the back-end selections served by the Interactive Voice Response System. Thus, once the Interactive Voice Response System is traversed, the user can interact with the computer site to perform the desired tasks or the personal computer can automatically execute the transaction independent of the user.

The present IVR access system enables the service provider to use the Interactive Voice Response System to serve both human users who are equipped with only a touch tone telephone as well as human users who are equipped with a personal computer and a modem. The service provider therefore avoids the need to have multiple dedicated lines, each equipped with a modem, to serve the personal computer users and instead can use the existing Interactive Voice Response System to serve both types of users.

DETAILED DESCRIPTION

Figure 1:
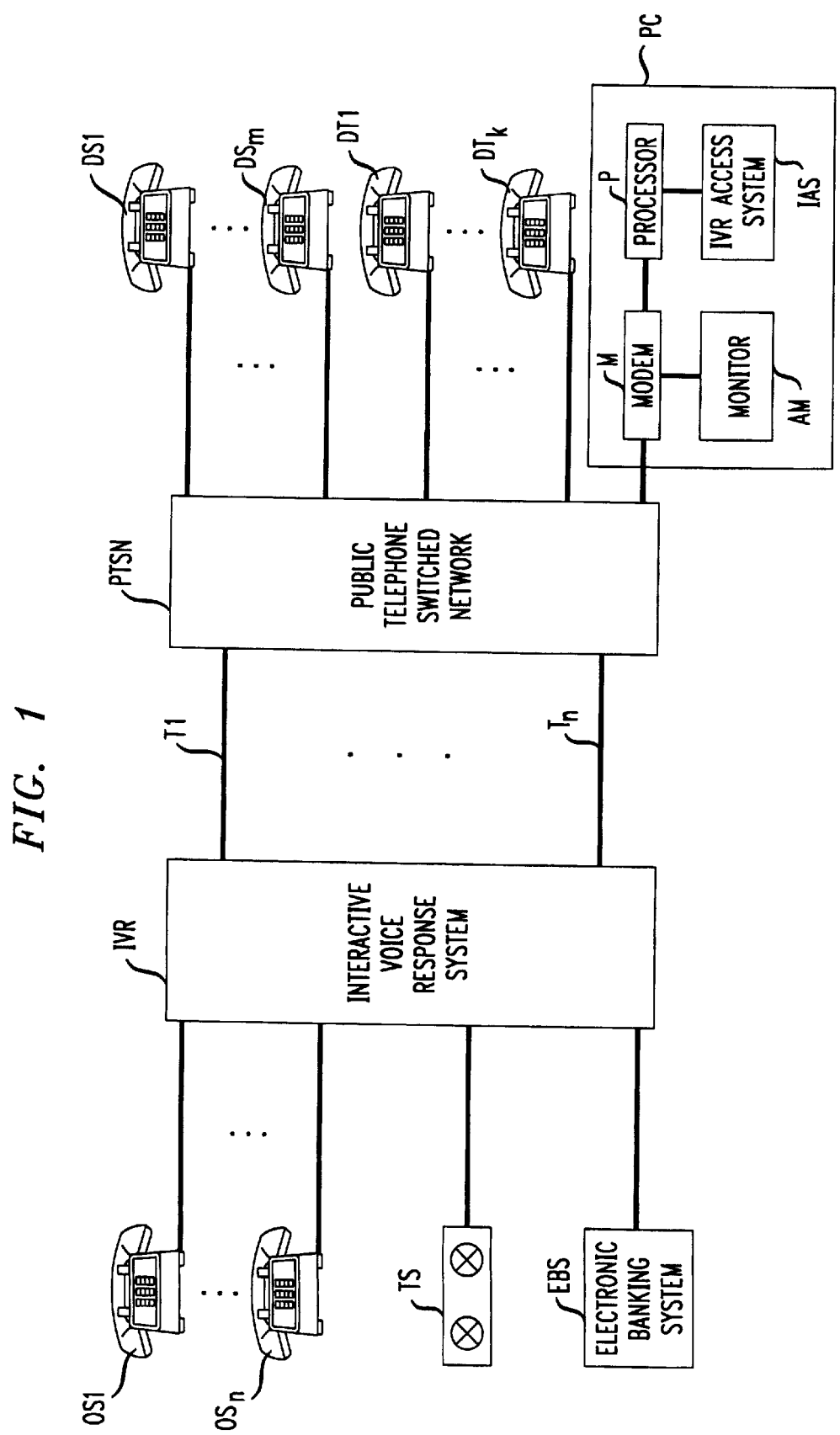
FIG. 1 illustrates in block diagram form the architecture of the present system for providing personal computer access to an Interactive Voice Response System.
Figure 2:
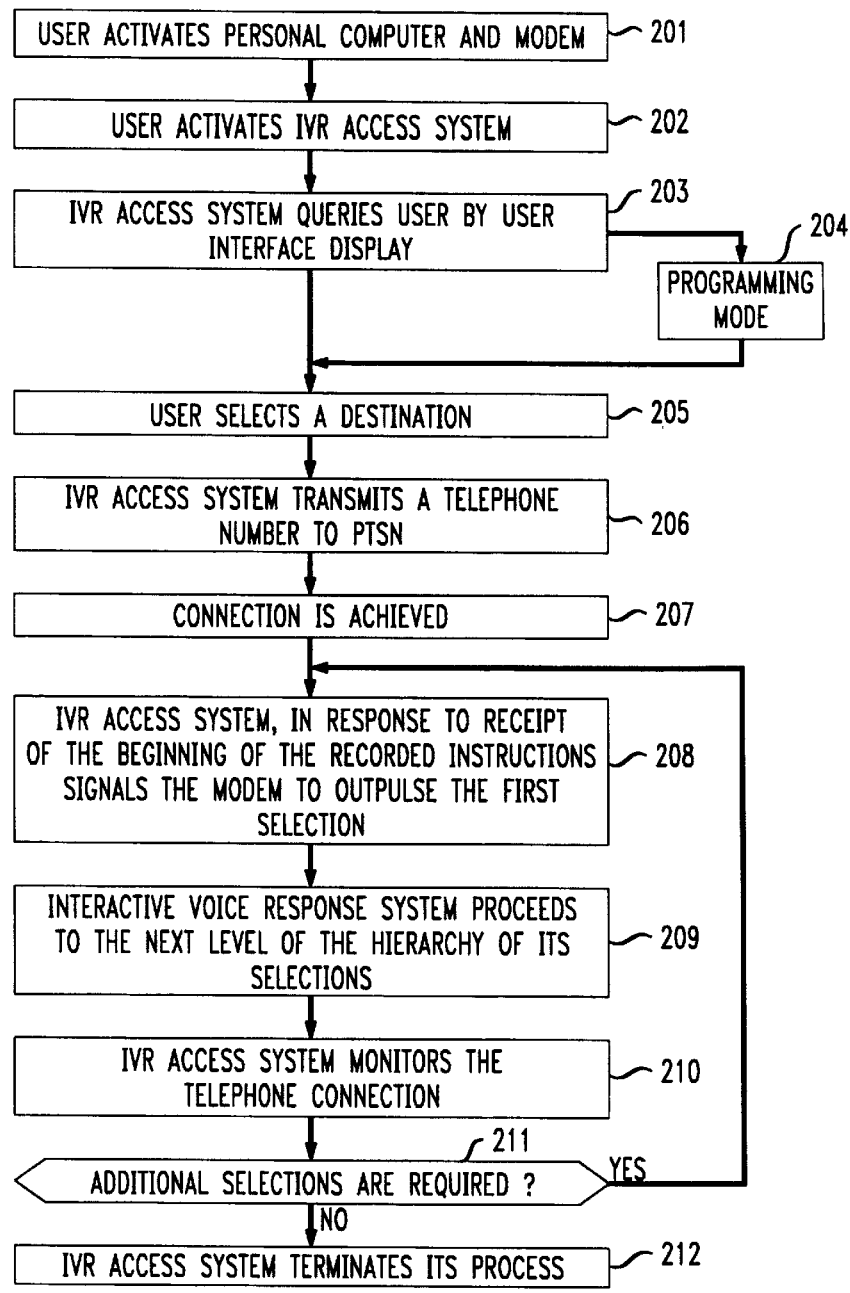
FIG. 2 illustrates in flow diagram form the operation of the present system for providing personal computer access to an Interactive Voice Response System.

FIG. 1 illustrates in block diagram form the architecture of the present IVR access system, while FIG. 2 illustrates in flow diagram form the operation of this system. For the sake of illustration, the application illustrated herein is that of a financial institution, such as a bank, that is equipped with an existing Interactive Voice Response System IVR to provide customers with inexpensive yet efficient access to a set of desired services. In order to limit the expense involved in providing operators, the Interactive Voice Response System IVR front end serves to interface with the calling party and provides prompts to the calling party to enable the Interactive Voice Response System IVR to acquire sufficient customer information to direct the call in an appropriate and efficient manner.

The Interactive Voice Response System IVR is shown as providing the front end interface for a number of service providing elements, such as: operator positions OS1-OSn, electronic banking system EBS, recorded information sources TS, and the like. The Interactive Voice Response System IVR provides a plurality of telephone line interfaces to interconnect the Interactive Voice Response System IVR to a plurality of lines T1-Tn of the Public Telephone Switched Network PTSN, which serves to interconnect a plurality of subscribers to each other and to the Interactive Voice Response System IVR. The subscribers can be equipped with rotary dial telephones DS1-DSm, or touch-tone telephones DT1-DTk, or modem-equipped personal computers PC.

A subscriber can dial into the Interactive Voice Response System IVR, using for example their touch-tone telephone DT1 and a communication connection comprising one of access lines Tn. The subscriber then transmits DTMF signals that are generated by their touch-tone telephone DT1 over the communication connection to reach a desired one of the above-noted service providing destinations, such as operator position OS1, as guided by the operation of the Interactive Voice Response System IVR. In particular, the Interactive Voice Response System IVR typically is programmed with a hierarchically ordered series of audio messages, each of which comprises a listing of the various choices available to the calling party at that particular juncture of the hierarchy. In response to presentation of these choices, the calling party typically elects to traverse another level of the hierarchy by selecting one of the options that were offered by the particular audio segment that was most recently presented to the calling party by the Interactive Voice Response System IVR. The calling party presents their selection by operating a touch tone key on the telephone station set DT1 to produce DTMF signals on the communication connection to thereby indicate to the Interactive Voice Response System IVR the one of the plurality of choices that were offered.

The Interactive Voice Response System IVR monitors the communication connection of access line Tn for the presence of touch tone (DTMF) signals that are indicative of a calling party selection of one of the menu options that is presently being offered. In response to receipt of a touch tone signal, the Interactive Voice Response System IVR traverses the hierarchy to the particular selection that was indicated by the presented touch tone signal. In this manner, the Interactive Voice Response System IVR enables the calling party at touch tone telephone DT1 to traverse a plurality of hierarchically organized choices to reach a particular service (operator position OS1) or feature that is of interest to the calling party. Once the selection process is completed, the Interactive Voice Response System IVR directly connects the subscriber's touch tone telephone DT1 to the desired destination, operator position OS1 to enable the subscriber to communicate via voice communication with the operator at operator position OS1.

System For Providing Personal Computer Access To An IVR

In order to enable the user who is equipped with a personal computer PC to automatically traverse the Interactive Voice Response System IVR to access one of the back-end service providing systems, such as electronic banking system EBS, the present IVR access system IAS is located in the personal computer PC and comprises a script executing process for processor P that traverses the Interactive Voice Response System IVR for the subscriber. In operation, as shown in FIG. 2, the user activates the personal computer PC and switches the modem M into the ON state at step 201 to thereby access the Public Telephone Switched Network PTSN. The user then activates the present IVR access system IAS at step 202 to initiate access to a selected service providing system, such as the electronic banking system EBS that is one of the back-end service providing systems that can be accessed through the Interactive Voice Response System IVR. At step 203, the IVR access system IAS queries the user by the presentation of a user interface display. The user interface display provides the user with multiple choices, typically in menu form, to identify the one of the plurality of destinations that the user wishes to access as well as the mode of access: immediate or time delayed. Included in this menu can be the choice of a new destination, in which case, the IVR access system IAS enters the programming mode at step 204 wherein the user inputs the script necessary to define the path required to traverse a selected Interactive Voice Response System IVR to reach a desired destination. The programming can be command strings input via the personal computer keyboard (not shown), command strings input via voice recognition software resident on the personal computer, or command strings downloaded from a rewriteable media element loaded into the personal computer. Once this programming is completed, processing returns to step 205.

In the present example, the user selects a destination and a time of activation (immediate for this example) at step 205 that is presently defined in the menu choices offered by the IVR access system IAS, or has just been programmed into the system. At step 206, the IVR access system IAS signals the modem M to go off hook and, upon receipt of dial tone from the Public Telephone Switched Network PTSN, transmits a telephone number from the memory of the IVR access system IAS to the modem M. The modem M outpulses in touch tone form the dialed number on the communication connection to the access line Tn of the Interactive Voice Response System IVR and awaits connection to the Interactive Voice Response System IVR. Once the connection is achieved at step 207, the Interactive Voice Response System IVR begins its preordained presentation, since it is unaware of the nature of the calling party: human with a dial telephone, human with a touch-tone telephone, human with a modem equipped personal computer. Therefore, it is up to the IVR access system IAS to exercise the Interactive Voice Response System IVR.

Figure 3:
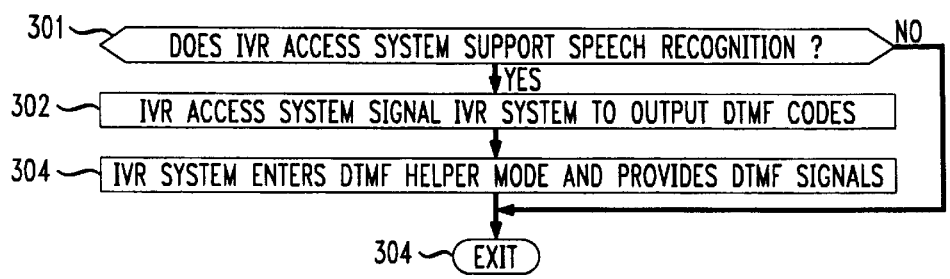
FIG. 3 illustrates in flow diagram form the operation of the present system for providing personal computer access to an Interactive Voice Response System in activating either a voice recognition or DTMF helper mode of operation.

The IVR access system IAS can operate in two modes: speech recognition or DTMF prompts. In particular, once the IVR access system IAS is connected to the Interactive Voice Response System processing of step 207 branches to the subrouting illustrated in FIG. 3 to set the mode of communication with the Interactive Voice Recognition System IVR. At step 301, the IVR access system IAS determines whether speech recognition capability is available in personal computer PC. If it is, processing advances to step 304 where the subroutine exits to step 208. If speech recognition is not available, then procesing advances to step 302 where the IVR access system IAS outputs code signals in the form of a string of DTMF signals generated by modem M, which code signals alert the Interactive Voice Recognition System IVR that DTMF helper tones are requested. In response to the receipt of the code signals, the Interactive Voice Recognition System IVR enters the DTMF helper mode at step 303 and outputs DTMF tones to the IVR access system IAS either in place of or in conjunction with the audio announcements at each level of the hierarchy of voice response menu to thereby identify which choice in the menu is presently offered. Processing then exits at step 304 to return procesing to step 208 of FIG. 2. The IVR access system IAS then operates to traverse the menu of choices provided by the Interactive Voice Recognition System IVR.

This is accomplished by the IVR access system IAS at step 208, in response to receipt of the beginning of the recorded instructions (and/or the DTMF helper tones) from the Interactive Voice Response System IVR, as detected by the audio monitor circuit AM, signaling the modem M to outpulse the first selection required to traverse the Interactive Voice Response System IVR. The modem M converts the received digit into a touch-tone signal which is transmitted to the Interactive Voice Response System IVR over the communication connection.

Typically, the Interactive Voice Response System IVR comprises a multi-level hierarchy of selections and receipt of a touch-tone signal indicative of a subscriber selection causes the Interactive Voice Response System IVR to proceed to the next level of the hierarchy of its selections at step 209. Thus, the process of steps 208, 209, 210 must be repeated a number of times to access the desires service providing system, electronic banking system EBS. Therefore, at step 210 in response to the outpulsing of the first digit, the IVR access system IAS monitors the telephone connection for a moment of silence, followed by the presentation of the next level of recorded instructions and/or DTMF tones, as detected by the audio monitor circuit AM. Alternatively, a voice recognition process of processor P can interpret the recorded instructions to identify the present level of the hierarchy of the Interactive Voice Response System IVR. The IVR access system IAS then proceeds to step 211 to determine whether additional selections are required to traverse the Interactive Voice Response System IVR. If so, processing returns to step 208 and the IVR access system IAS repeats the process of steps 208–210 until the desired service providing system EBS is reached.

The IVR access system IAS then terminates its process at step 212 and either enables the user to directly interact with the selected service providing system EBS via the personal computer PC and the modem M connection thereto or automatically continues the communication session by outputting a predefined set of data to the electronic banking system EBS. For example, the user can program an entire transaction into the personal computer PC to thereby automatically execute the application independent of the user and at a predetermined time. In a typical application, the user can query the electronic banking system EBS to determine an account balance by including both the interactive voice response IVR system access session in the transaction, and the data transfer session that follows in the transaction. The data transfer session includes the coding of the data, such as the user account number and password, for presentation to the electronic banking system EBS as well as providing the feedback support to receive and appropriately respond to the data transmitted by the electronic banking system EBS to the personal computer PC. As noted above, this entire communication session can be stored in the IVR access system IAS for automatic execution at a later time by the personal computer PC.

SUMMARY

The present IVR access system therefore enables the service provider to use the existing Interactive Voice Response System to serve both human users who are equipped with only a touch tone telephone as well as human users who are equipped with a personal computer and a modem. The service provider therefore avoids the need to have multiple dedicated lines, each equipped with a modem, to serve the personal computer users and instead can use the existing Interactive Voice Response System to serve both types of users.

What is claimed:

1. A system, resident in a personal computer, for enabling a subscriber at said personal computer selected access to a desired service destination from a hierachy of service destination that is served by an interactive voice response system, comprising:

means for storing a predefined voice response script that has at least one signaling step included therein; and means, responsive to the establishment of a connection from said personal computer to an interactive voice response system, for seriatim executing each signaling step of said predefined voice response script exclusive of said subscriber having to execute said voice response script for correction through said hierachy of service destinations.

2. The system of claim 1 wherein said means for seriatim executing comprises:

modem means, connected to a communication line, for establishing a communication connection from said personal computer to said interactive voice response system; and means for activating said modem means to output touch tone signals over said communication connection.

3. The system of claim 2 wherein said means for activating comprises:

means for determining presence of an audio signal from said interactive voice response system on said communication connection; and means, responsive to said means for determining, for executing a next unexecuted one of said at least one signalling step.

4. The system of claim 3 wherein said means for activating further comprises:

means for disabling operation of said means for executing after execution of a one of said at least one signalling step until said means for determining detects an absence of said audio signal from said interactive voice response system on said communication connection.

5. The system of claim 3 wherein said means for activating further comprises:

means, responsive to signals present on said communication connection indicative of connection to said desired destination, for executing at least one of said at least one signalling step to implement a data communication session with said desired destination.

6. The system of claim 2 further comprising:

means for storing data indicative of a user defined time at which said used desires said establishment of said connection to be initiated; and means, responsive to a present time corresponding to said user defined time, for enabling operation of said means for activating.

7. The system of claim 1 further comprising:

means, responsive to said predefined voice response script being executed in its entirety, for terminating operation of said system for enabling personal computer access to a desired destination that is served by said interactive voice response system.

8. A method of operating a system, resident in a personal computer, for enabling a subscriber at said personal computer selected access to a desired service destination from a hierarchy of service destinations that is served by a voice response system, comprising the steps of:

storing in said personal computer a predefined voice response script that has at least one signaling step included therein; and seratim executing, in response to the establishment of a connection from said personal computer to a voice response system, each signaling step of said predefined voice response script exclusive of said subscriber having to execute said voice response script, wherein said excuting step establishes said connection through said hierarchy of service destinations.

9. The method of claim 8 wherein said step of seriatim executing comprises:

establishing, via a modem that is connected to a communication line, a communication connection from said personal computer to said voice response system; and activating said modem to output touch tone signals over said communication connection.

10. The method of claim 9 wherein said step of activating comprises:

determining presence of an audio signal from said voice response system on said communication connection; and executing, in response to said step of determining, a next unexecuted one of said at least one signalling step.

11. The method of claim 10 wherein said step of activating further comprises:

disabling operation of said step of executing after execution of a one of said at least one signalling step until said step of determining detects an absence of said audio signal from said voice response system on said communication connection.

12. The method of claim 11 wherein said step of activating further comprises:

executing, in response to signals present on said communication connection indicative of connection to said desired destination, at least one of said at least one signalling step to implement a data communication session with said desired destination.

13. The method of claim 9 further comprising the steps of:

storing data indicative of a user defined time at which said used desires said establishment of said connection to be initiated; and activating, in response to a present time corresponding to said user defined time, for enabling operation of said step of activating.

14. The method of claim 8 further comprising the step of:

terminating, in response to said predefined voice response script being executed in its entirety, operation of said system for enabling personal computer access to a desired destination that is served by said interactive voice response system.

* * * * *